United States Patent

Kobayashi

Patent Number: 5,295,919
Date of Patent: Mar. 22, 1994

[54] POWER TRANSMITTING SYSTEM FOR A FOUR-WHEEL DRIVE MOTOR VEHICLE

[75] Inventor: Toshio Kobayashi, Tokyo, Japan

[73] Assignee: Fuji Jukogyo Kabushiki Kaisha, Tokyo, Japan

[21] Appl. No.: 963,828

[22] Filed: Oct. 20, 1992

[30] Foreign Application Priority Data

Oct. 22, 1991 [JP] Japan .................................. 3-302404
Dec. 4, 1991 [JP] Japan .................................. 3-348205

[51] Int. Cl.$^5$ .............................................. F16H 3/44
[52] U.S. Cl. .................................................. 475/205
[58] Field of Search ..................... 475/202, 205, 206; 180/248

[56] References Cited

U.S. PATENT DOCUMENTS 4,726,254 2/1988 Kubo et al. ................. 475/202 X
4,833,943 5/1989 Bucksch ...................... 475/205 X

FOREIGN PATENT DOCUMENTS

4-27622 1/1992 Japan .

Primary Examiner—Dirk Wright
Attorney, Agent, or Firm—Martin A. Farber

[57] ABSTRACT

A central differential has first and second output members for distributing power of an engine through a transmission to front and rear wheels respectively, and has a third output member for controlling distribution of the power. A first friction clutch is operatively connected to the first and second output members for restricting differential operation of the central differential and for controlling distribution of the power to the front and rear wheels. A second friction clutch is operatively connected to the second output member and either the front or rear wheels. A brake is provided for braking the second output member for providing a higher speed gear ratio than that of the smallest gear ratio of said transmission and to improve driveability of said vehicle.

15 Claims, 6 Drawing Sheets

POWER TRANSMITTING SYSTEM FOR A FOUR-WHEEL DRIVE MOTOR VEHICLE

BACKGROUND OF THE INVENTION

The present invention relates to a system for transmitting power of an engine to four wheels of a four-wheel drive motor vehicle having a central differential, and more particularly to a system which may increase the number of the speed ranges of an automatic transmission.

A conventional four-wheel drive motor vehicle has the central differential having a functional control device for restricting the differential operation and for controlling distribution of an output torque of the transmission to front and rear wheels of the vehicle. Recently, the central differential is used for variably controlling the torque distribution, or used as a reduction gear or speed-up gear for the automatic transmission, thereby improving driveability, operability, stability and braking effect of the vehicle.

Japanese Patent Application Laid-Open 4-27622 discloses the four-wheel drive motor vehicle providing the central differential which comprises a complex planetary gear device and a control device is provided. The control device comprises first and second fluid operated multiple-disk friction clutches and a brake for a 5th speed for providing a 5th speed. The first clutch is provided for transmitting the power of an engine from a transmission to front and rear wheels. The second clutch is provided for restricting the differential operation of the central differential and variably distributing the output torque of the transmission to the front and rear wheels.

However, in such a system, the torque distribution function and differential operation function are limited by the 5th speed providing system.

Furthermore, it is desirable for be capable of using such a central differential for a two-wheel drive motor vehicle such as a front-wheel drive motor vehicle having a front-mounted engine.

SUMMARY OF THE INVENTION

An object of the present invention is to provide a power transmitting system for a four-wheel drive motor vehicle having a central differential which may also be used for increasing the number of operational ranges of the transmission for a two-wheel drive motor vehicle.

Another object of the present invention is to provide the power transmitting system in which the central differential for controlling torque distribution to the front and rear wheels is used for easily increasing the number of operational ranges of the transmission.

According to the present invention, there is provided a power transmitting system for a four-wheel drive vehicle provided with a central differential comprised of a complex planetary gear device having first and second output members for distributing the power of an engine through a transmission to front and rear wheels respectively, and having a third output member for controlling distribution of the power.

The system comprises as restricting means first friction engagement means operatively connected to the second and third output members for restricting differential operation of the central differential and for controlling distribution of the power to the front and rear wheels, second friction engagement means operatively connected to the second output member so as to provide a higher speed gear ratio than that of the smallest gear ratio of the transmission.

In an aspect of the invention, the second friction engagement means is a brake provided for braking the second output member of the central differential.

The other objects and features of this invention will become understood from the following description with reference to the accompanying drawings.

DETAILED DESCRIPTION OF THE PREFERRED EMBODIMENTS

Figure 1:
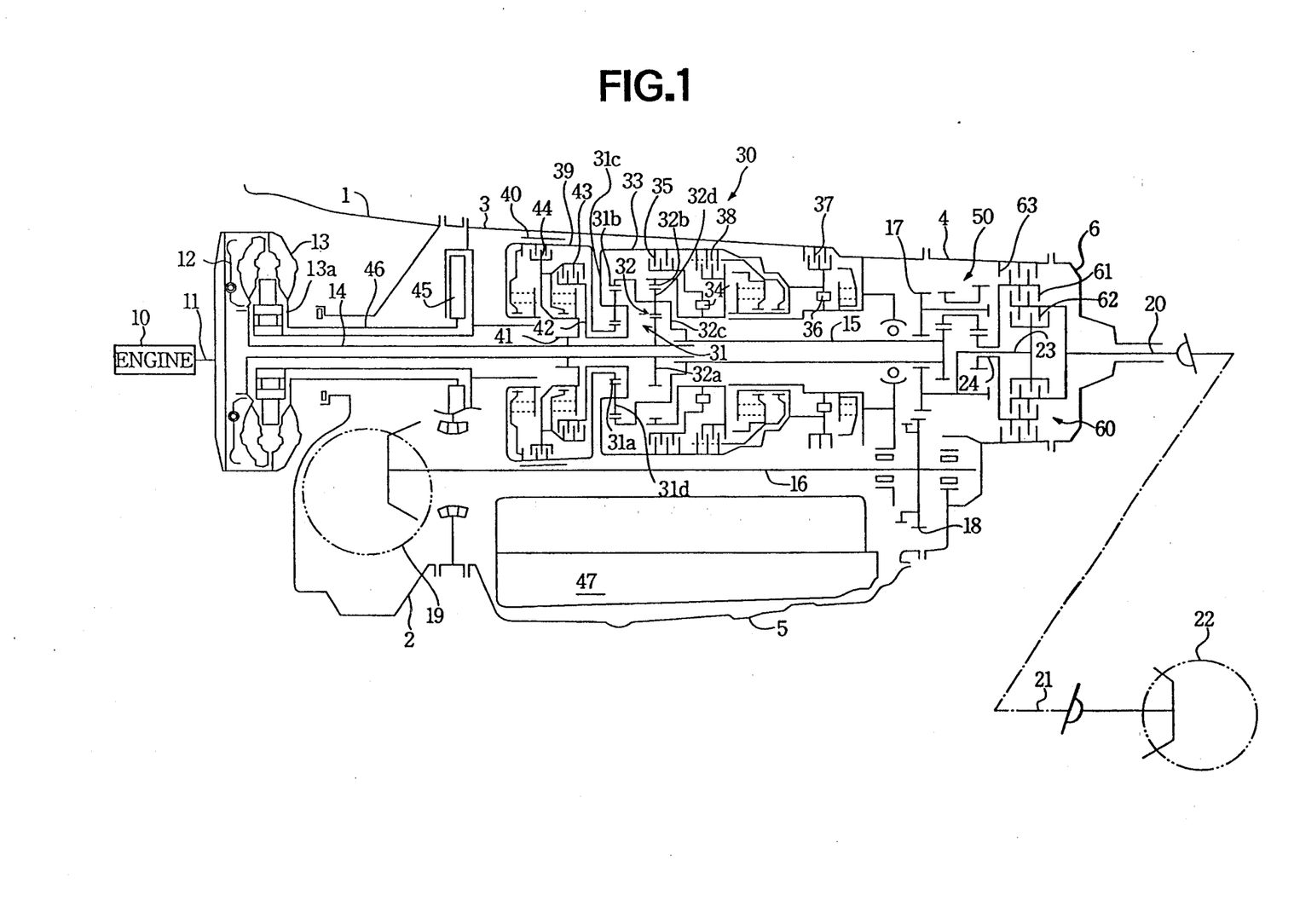
FIG. 1 shows a schematic diagram of a power transmitting system for a four-wheel drive motor vehicle according to the present invention.

FIG. 1 shows a power transmission system in a transaxle type for a four-wheel drive motor vehicle having an engine 10 at a front portion thereof. The power transmission system has a torque converter 13 with a lockup clutch 12 mounted in a converter box 1, and a front differential 19 mounted in a differential box 2 behind the torque converter 13. A transmission case 3 housing an automatic transmission 30 is attached to a rear of the differential box 2. An oil pan 5 is attached to an underside of the transmission case 3. A crankshaft 11 of the engine 10 is operatively connected with the torque converter 13. An input shaft 14 extends from a turbine of the torque converter 13 to the automatic transmission 30. Output of the automatic transmission 30 is transmitted to an output shaft 15 which is aligned with the input shaft 14 for rearwardly transmitting the torque. The output shaft 15 is connected to a front drive shaft 16 which is disposed in parallel under the automatic transmission 30 through a pair of reduction gears 17 and 18 of a central differential 50 housed in a transfer case 4. A central differential control device 60 housed in an extension case 6 is disposed behind the central differential 50. The front drive shaft 16 is connected to front wheels through the front differential 19. The output shaft 15 is connected to a rear drive shaft 20 provided in the extension case 6 through the central differential 50 and the control device 60. The rear drive shaft 20 is connected to rear wheels of the vehicle through a propeller shaft 21 and a rear differential 22.

The automatic transmission 30 comprises two sets of single planetary gears consisting of a front planetary gear 31 and a rear planetary gear 32 for providing four forward speeds and one reverse speed. The front planetary gear 31 comprises a sun gear 31a, a pair of planetary pinions 31d, a ring gear 31b, and a carrier 31c. The rear planetary gear 32 comprises a sun gear 32a, a pair of planetary pinions 32d, a ring gear 32b, and a carrier 32c. The input shaft 14 is engaged with the rear sun gear 32a, and the front ring gear 31b and the rear carrier 32c are connected to the output shaft 15.

Between a connecting element 33 formed integral with the front carrier 31c and the rear ring gear 32b, a first one-way clutch 34 and a forward clutch 35 are disposed in series. A second one-way clutch 36 and a low and reverse brake 37 are disposed in parallel with the connecting element 33 and the transmission case 3. An overrunning clutch 38 is disposed between the connecting element 33 and the ring gear 32b. A brake band 40 is provided on a connecting element 39 integral with the sun gear 31a. A high clutch 43 is mounted between a connecting element 41 integral with the input shaft 14 and a connecting element 42 integral with the carrier 31c. A reverse clutch 44 is provided between the connecting elements 39 and 41.

An oil pump 45 is provided at a front end of the transmission case 3. A pump drive shaft 46 is connected to an impeller 13a of the torque converter 13 and is operatively connected to a rotor of the oil pump 45.

In the oil pan 5, a control valve body 47 is provided for hydraulically actuating respective clutches and a brake of the transmission 30.

Figure 2:
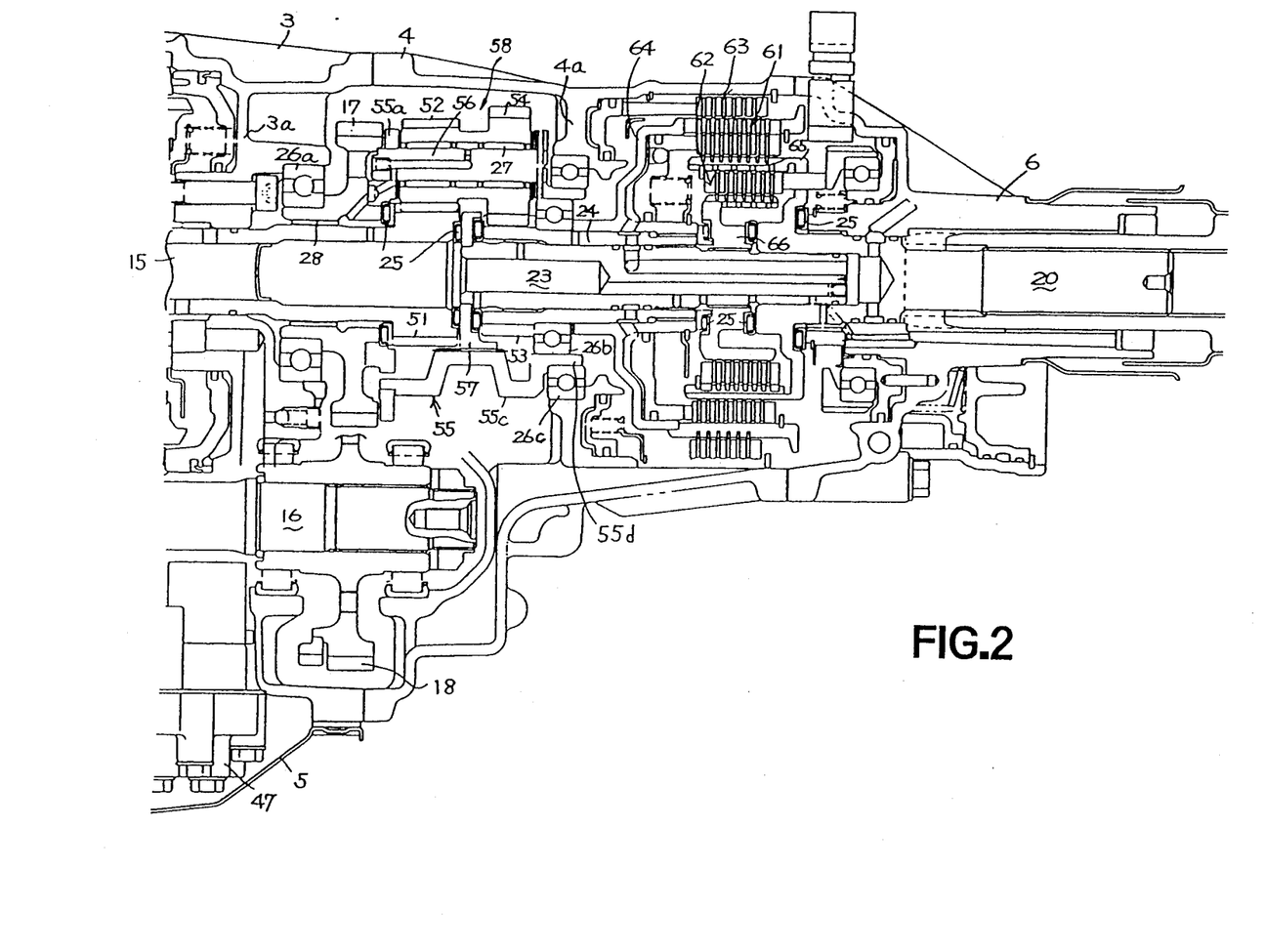
FIG. 2 shows an enlarged sectional view of a central differential and a central differential control device of the system.

Referring to FIG. 2 showing the central differential 50 and the control device 60, a first intermediate shaft 23 is rotatably mounted in the output shaft 15 at a front portion thereof. A rear portion of the intermediate shaft 23 is rotatably mounted in the rear drive shaft 20. A second intermediate shaft 24 is rotatably mounted on the rear portion of the first intermediate shaft 23. The reduction gear 17 is rotatably mounted on the output shaft 15 through a bearing 28 and a thrust bearing 25. The reduction gear 17 and the output shaft 15 are mounted on an inside wall 3a of the transmission case 3 through a ball bearing 26a. The central differential 50 is disposed between the output shaft 15, reduction gear 17, and intermediate shafts 23 and 24.

The central differential 50 as a complex planetary gear device comprises a first sun gear 51 formed on the output shaft 15, a first planetary pinion 52 meshed with the first sun gear 51, a second sun gear 53 formed on the second intermediate shaft 24, a second planetary pinion 54 meshed with the second sun gear 53, and a carrier 55.

The carrier 55 comprises a flange 55a secured to the reduction gear 17, three arms 55c engaged with flange 55a, and a boss 55d integral with the arms 55c. Each arm 55c has a U-shaped step portion. The first intermediate shaft 23 has a connecting member 57 disposed between the second sun gear 53 formed on the shaft 24 and the first sun gear 51 formed on the input shaft 15. The connecting member 57 is mounted in the arms 55c of the carrier 55 and splined thereto. The first and second planetary pinions 52 and 54 are integral with one another to form a pinion member 58. The pinion member 58 is rotatably mounted on a shaft 56 through needle bearings 27. The shaft 56 is inserted into the flange 55a and the boss 55d between the arms 55c. The boss 55d formed at the rear end of the carrier is rotatably mounted on the second intermediate shaft 24 through a ball bearing 26b and rotatably supported in the transfer case 4 through a ball bearing 26c.

Thus, the output torque from the output shaft 15 of the transmission 30 is transmitted to the carrier 55 and the second sun gear 53 through the first sun gear 51 and the pinions 52, 54 at predetermined respective torque split ratios. The difference between rotating speeds of the carrier 55 and the second sun gear 53 is absorbed by the rotation of the first and second planetary pinions 52 and 54.

Figure 4:
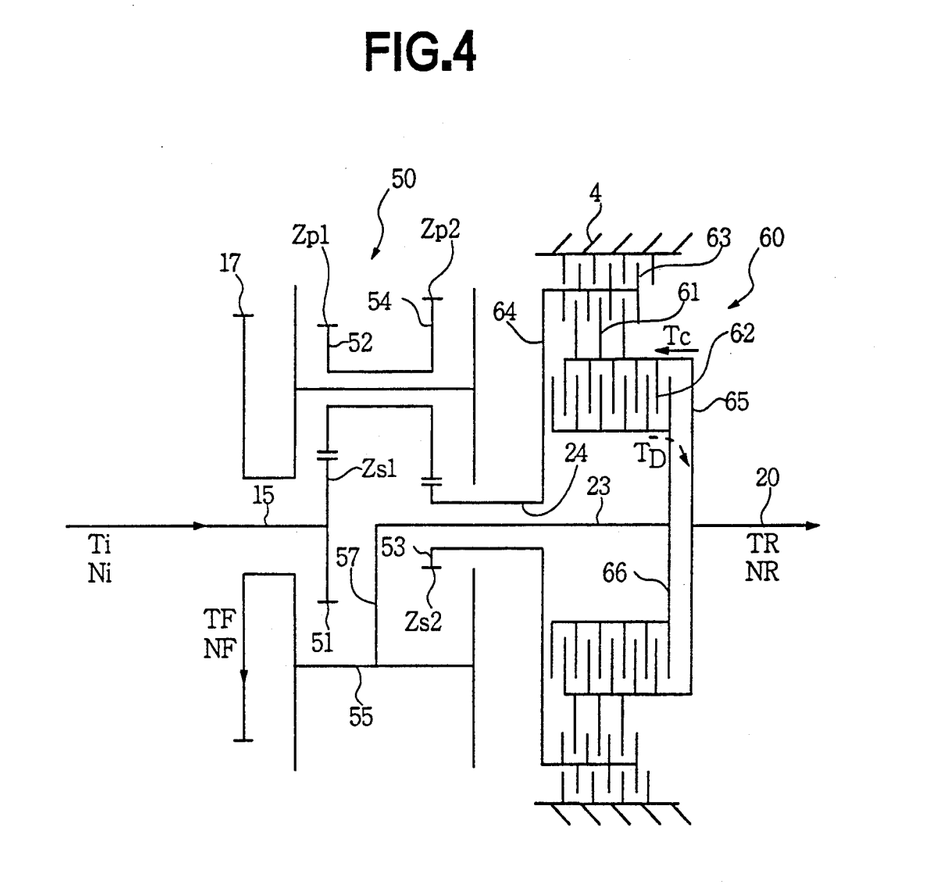
FIG. 4 is a schematic view showing the central differential and the control device for explaining the transmission of torque.

The operation of the central differential 50 for distributing the torque to front wheels and rear wheels will be described hereinafter with reference to FIG. 4.

Input torque Ti of the first sun gear 51 and the relationship between the sun gears 51,53 and pinions 52,54 are expressed as follows, respectively.

$$T_i = T_F + T_R \quad (1)$$

$$r_{s1} + r_{p1} = r_{s2} + r_{p2} \quad (2)$$

where $T_F$ is the front torque transmitted from the carrier 55 to the front drive shaft 16, $T_R$ is the rear torque transmitted from the second sun gear 53 to the rear drive shaft 20, $r_{s1}$ is the radius of the pitch circle of the first sun gear 51, $r_{p1}$ and $r_{p2}$ are radii of pitch circles of first and second pinions 52 and 54, respectively, and $r_{s2}$ is the radius of the pitch circle of the second sun gear 53.

A tangential load P on the engaging point of the first sun gear 51 and the first pinion 52 is equal to the sum of a tangential load $P_1$ on the carrier 55 and a tangential load $P_2$ on the engaging point of the second sun gear 53 and the second pinion 54. That is, $$P = T_i / r_{s1}$$

$$P_1 = T_F / (r_{s1} + r_{p1})$$

$$P_2 = T_R / r_{s2}$$

$$T_i / r_{s1} = \{T_F / (r_{s1} + r_{p1})\} + T_R / r_{s2} \quad (3)$$

Substituting equations (1) and (2) for the equation (3),
$$T_F = (1 - r_{p1} \cdot r_{s2} / r_{s1} \cdot r_{p2}) \times T_i$$

$$T_R = (r_{p1} \cdot r_{s2} / r_{s1} \cdot r_{p2}) \times T_i$$

Consequently, it will be seen that the standard torque distribution for the front torque $T_F$ and the rear torque $T_R$ can be set to various values by changing the radii of the pitch circles of the sun gears 51 and 53 and the pinions 52 and 54.

Here, radii $r_{s1}$, $r_{p1}$, $r_{p2}$ and $r_{s2}$ of the first sun gear 51, the first and second pinions 52, 54 and the second sun gear 53 can be replaced with the respective numbers of the teeth $Z_{s1}$, $Z_{p1}$, $Z_{p2}$, and $Z_{s2}$. If $Z_{p1} = Z_{p2} = 21$, $Z_{s1} = 33$, and $Z_{s2} = 21$, the torque distribution ratio of the front wheels and the rear wheels is $$T_F : T_R = 36.4 : 63.6$$

A large torque can be distributed to the rear wheels.

Figure 3:
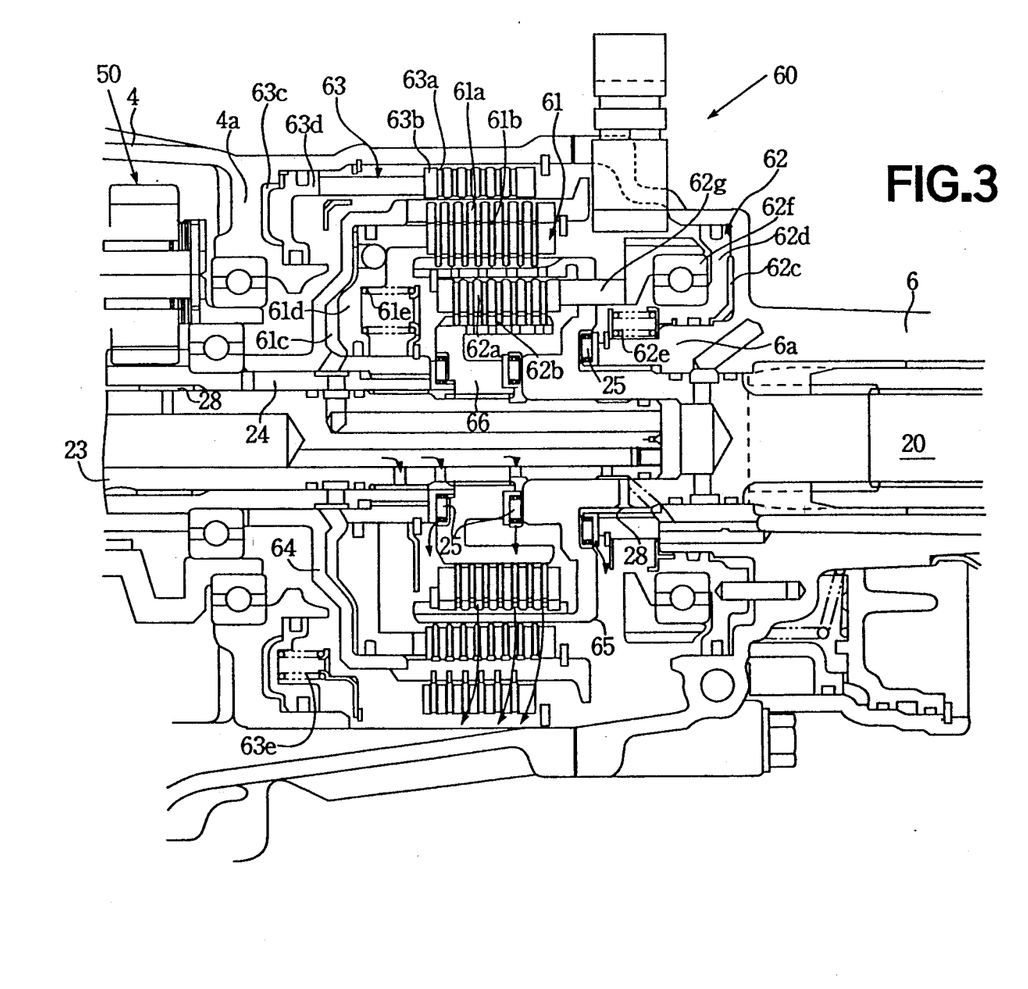
FIG. 3 an enlarged sectional view of the control device.

Referring to FIG. 3, the control device 60 in the extension case 6 comprises first and second fluid operated multiple-disk friction clutches 62 and 61 for changing the standard torque split ratios to the front and the rear wheels, and a 5th speed brake 63 as a brake for arresting the operation of the central differential 50. The clutches 62 and 61, and the brake 63 are coaxially triplicated on the first intermediate shaft 23 in the radial direction thereof.

The first clutch 62 is provided between the first intermediate shaft 23 and the rear drive shaft 20, and comprises a drive drum 66 splined on the first intermediate shaft 23 and a driven drum 65 formed on a front end of the rear drive shaft 20. A plurality of drive disks 62a are splined on the drive drum 66 and a plurality of driven disks 62b are splined on an inner periphery of the driven drum 65, disposed alternately with the disks 62a. A ring piston 62d is slidably mounted on a boss 6a of the extension case 6 formed at the inner portion thereof, and the inner wall of the extension case. An oil chamber 62c is defined between the piston 62d and the extension case 6 so as to prevent the centrifugal oil force from being generated. A return spring 62e provided in spring holder 62f is mounted on the boss 6a to abut the piston 62d.

On the piston 62d, a pressure member 62g is mounted through a ball bearing 62h for absorbing the difference of rotating speeds between the piston and disks.

When the oil is supplied to the chamber 62c, the piston 62d is pushed by the pressure of the oil. The pressure member 62g is moved toward the driven drum 65 to push the rods 68b in the drum 65 so that the rods 68b abut the retainer 69. Thus, the disks 62a and 62b are engaged with the adjacent disks to engage the clutch 62 for producing a clutch torque. Since the first intermediate shaft 23 is connected to the carrier 55 through the connecting member 57, the carrier 55 is connected to the first clutch 62 through the intermediate shaft 23.

In the clutch 62, since the piston 62d is indirectly engaged with the disks on the drum 65, the diameter of the piston is determined irrespective of the diameter of the disk and the drum. Therefore, even if the clutch 62 is provided in the innermost portion of the control device 60, the diameter of the piston can be increased for increasing the clutch torque.

The second clutch 61 is provided between the second intermediate shaft 24 and the rear drive shaft 20 and comprises a drive drum 64 splined on the second intermediated shaft 24 and the driven drum 65. A plurality of drive disks 61a are splined on an inner periphery the drive drum 64 and a plurality of driven disks 61b are splined on the driven drum 65, disposed alternately with the disks 61a. A ring piston 61d is slidably mounted on the inner wall of the drive drum 64. The piston 61d engages with the end disk 61a. An oil chamber 61c is defined between the piston 61d and the drive drum 64. A return spring 61e is provided between the piston 61d and the drive drum 64.

When the oil is supplied to the oil chamber 61c, the disks 61a and 61b are engaged to engage the clutch 61 so that the second intermediate shaft 24 is connected to the rear drive shaft 20 through the clutch 61.

The 5th speed brake 63 is provided on the second intermediate shaft 24. A plurality of disks 63a are splined on the drive drum 64. A plurality of disks 63b are splined on the inner periphery of the transfer case 4. A piston 63d is slidably mounted on a boss 4a of the transfer case 4. An oil chamber 63c is formed between the piston 63d and the transfer case 4. A return spring 63e is provided between the piston 63d and the transfer case 4.

When oil is supplied to the chamber 63c, the piston 63d is pushed by the pressure of the oil. The piston 63d pushes the disks 63b and 63a to effect the brake 63.

These shafts and drums are supported with each other through the bearing 28 and thrust bearings 25.

The clutches 61 and 62 and the brake 63 are hydraulically controlled by the operation of the system in the control valve body 47.

The operation of the automatic transmission 30 for providing the four forward speeds and one reverse speed will be described hereinafter.

In a first speed of a drive range or a "2" or "3" range, the forward clutch 35 is engaged. When the vehicle is accelerated, the ring gear 32b is fixed together with the connecting element 33 by engagement of one-way clutches 34 and 36. Thus, the output of the input shaft 14 is transmitted to the output shaft 15 through the sun gear 32a and the carrier 32c. When the vehicle is coasting, the one-way clutches 34 and 36 become free. Accordingly, regardless of the engagement of the overrunning clutch 38, the rotation of output shaft 14 is not transmitted to the engine, so that the engine braking does not effect occur.

In the 1st speed of a "1" range, the low and reverse brake 37 and the overrunning clutch 38 are engaged, so that the ring gear 32b is always locked to effect the engine braking.

In a 2nd speed of the drive range or the "2" or "3" range, the forward clutch 35 and the brake band 40 are engaged to lock the sun gear 31a. The rotation of the carrier 31c is transferred to the ring gear 32b through the connecting element 33, the forward clutch 35, and the one-way clutch 34, for increasing in speed. When the vehicle is decelerated, the overrunning clutch 38 is engaged to hold the engagement of the connecting element 33 with the ring gear 32b. Thus, the rotation of the output shaft 15 is transmitted to the engine to effect engine braking.

In the 3rd speed of the drive range or a "3" range, the forward clutch 35 and the high clutch 43 are engaged, so that the input shaft 14 is coupled with the ring gear 32b by the high clutch 43 through the connecting elements 41, 42, the carrier 31c, the connecting element 33, the forward clutch 35, and the one-way clutch 34. Accordingly, the rear planetary gear 32 is integrated as one unit to directly connect the input shaft 14 with the output shaft 15. At deceleration, the overrunning clutch 38 is engaged for restricting the, oneway clutch 34, thereby effecting the engine braking.

In a drive range 4th speed, in addition to the drive range or "3" range of the 3rd speed operation, the brake band 40 clamps the sun gear 31a. The ring gear 31b is rotated at higher speed and the rotation is transferred to the output shaft 15. In this range, since the rotation is transmitted without the one-way clutches 34, 36, engine braking is always effected.

In a reverse range (R), the reverse clutch 44 is engaged. The input shaft 14 drives the sun gear 31a. The carrier 31c is fixed together with the connecting element 33 by the engagement of the low and reverse brake 37. The ring gear 31b in the front planetary gear 31 rotates in the reverse direction to drive the output shaft 15 at a large gear ratio, for providing the reverse speed.

During the aforementioned operations, the brake 63 for the fifth speed is released. The clutch 61 is engaged to provide the four-wheel drive system. The clutch 62 is engaged to produce a clutch torque for restricting the differential operation corresponding to the slipping of the front wheels and rear wheels.

In the fifth speed of the drive range, the brake 63 is engaged to lock the second intermediate shaft 24 and the second sun gear 53, thereby preventing the differential operation of the central differential 50. The carrier 55 serves as a speed-up gear for increasing the speed of the first sun gear 51. In this state, if the gear ratio obtained by the central differential 50 is insufficient, the transmission 30 is shifted to the second speed.

If a gear ratio of the second speed is $i_2$ and a gear ratio obtained by the central differential 50 is ip, a gear ratio of the fifth speed $i_5$ is represented as $$i_5 = i_2 \cdot i_p$$

In accordance with the aforementioned conditions of gears and pinions of the central differential 50, the gear ratio ip is ip=(33−21)/33=0.363. If $i_2$ is 1.545, $i_5$ becomes 0.561. Thus, the gear ratio which is smaller than that of the fourth speed is obtained at a proper gear ratio interval. The hydraulic pressure of the clutch 62 is controlled corresponding to the driving conditions of the engine 10 and the conditions on the road surface for producing a necessary transmitting torque. Thus, the four-wheel drive system is established with a torque split control system.

The operations of clutches and brakes of the transmission 30 and the control device 60 in relation to the shift ranges are shown in the table 1.

TABLE 1

| RANGES | CLUTCHES, BRAKES | | | | | | | | | | |
|---|---|---|---|---|---|---|---|---|---|---|---|
| | 44 | 40 | 43 | 35 | 34 | 38 | 37 | 36 | 63 | 61 | 62 |
| D RANGE | | | | | | | | | | | |
| 1ST SPEED | | | ○ | ○ | | | ○ | | | ○ | ● |
| 2ND SPEED | | ○ | ○ | ○ | | | | | | ○ | ● |
| 3RD SPEED | | | ○ | ○ | ○ | | | | | ○ | ● |
| 4TH SPEED | | | ○ | ○ | | ○ | | | | ○ | ● |
| 5TH SPEED | | | ○ | | | ○ | | | ○ | | ⊚ |
| REVERSE | ○ | | | | | | ○ | | | ○ | ● |

In the table 1, marks ○ show engagements of clutches and brake, marks ● show clutch torque produced in the clutch 62 for restricting the differential operation, and a mark ⊚ shows the transmitting torque for controlling the split of torque to front and rear wheels.

The table 2 shows gear ratios, examples of gear ratio and torque distribution ratios in relation to the shift ranges.

TABLE 2

| | GEAR RATIO | EXAMPLES | STANDARD TORQUE SPLIT RATIO TF/TR |
|---|---|---|---|
| 1ST SPEED | $i1 = 1 + (1/a2)$ | 2.785 | 36.4/63.6 |
| 2ND SPEED | $i2 = (a1 + a2 + a1 \cdot a2)/(1 + a1)a2$ | 1.545 | " |
| 3RD SPEED | $i3 = (1 + a2)/(1 + a2)$ | 1.000 | " |
| 4TH SPEED | $i4 = 1/(1 + a1)$ | 0.694 | " |
| 5TH SPEED | $i5 = i2 \cdot ip$ | 0.561 | POWER DISTRIBUTION BY CLUTCH |
| REVERSE | $iR = 1/a1$ | 2.272 | 36.4/63.6 |

In the table 2, $a_1$ is a gear ratio of the number of the teeth $Z_{fs1}$ of the sun gear 31a to the number of the teeth $Z_{R1}$ of the ring gear 31b in the front planetary gear 31 obtained by $a_1 = Z_{fs1}/Z_{R1}$, and $a2$ is a gear ratio of the number of the teeth $Z_{rs2}$ of the sun gear 32a to the number of the teet $Z_{R2}$ of the ring gear 32b in the rear planetary gear 32 obtained by $a2 = Z_{rs2}/Z_{R2}$.

If rotating speeds of the ring gear 31b, the sun gear 31a and the carrier 31c of the front planetary gear 31 are $N_{R1}$, $N_{s1}$, $N_{c1}$, respectively, the relationship between the rotating speeds of each element for the front planetary gear 31 is represented by an equation as follows.

$$N_{R1} a_1 \cdot N_{s1} = (1 + a_1) \cdot N_{c1}$$

where $a_1 = Z_{fs1}/Z_{R1}$. If rotating speed of the ring gear 32b, the sun gear 32a and the carrier 32c of the rear planetary gear 32 are $N_{R2}$, $N_{s2}$, and $N_{c2}$, respectively, the relationship between the rotating speeds of each element of the rear planetary gear 32 is represented by an equation as follows.

$$N_{R2} + a_2 \cdot N_{s2} = (1 + a_2) N_{c2}$$

where $a_2 = Z_{rs2}/Z_{R2}$.

Describing the operation of the system, the power of the engine 10 is transmitted through the torque converter 13 and the input shaft 14 to the transmission 30. Accordingly, the front and rear planetary gears 31 and 32 are operated and clutches 44, 43, 35, 38, 36, 34 and brakes 40, 37 are selectively actuated, so that the four forward speeds and one reverse speed are provided as described hereinbefore. The output of the transmission 30 is transmitted to the first sun gear 51 of the central differential 50.

In order to stably drive the vehicle on roads in general, the second clutch 61 is engaged, thereby connecting the second sun gear 53 of the central differential 50 with the rear drive shaft 20 through the second intermediate shaft 24 and the clutch 61. Thus, the first mode, wherein the torque is distributed in accordance with the first standard torque split ratio is selected. Namely, the standard torque split ratio is determined $T_F$: $T_R = 36.4:63.6$, dependent on the number of the teeth of the first and second sun gear 51, 53 and the pinions 52, 54. Thus, 36.4% of the output torque of the transmission 30 is transmitted to the front wheels through the carrier 55, the reduction gears 17, 18, the first drive shaft 16 and the front differential 19. Meanwhile, 63.6% of the torque is transmitted to the rear wheels through the second sun gear 53, the second intermediate shaft 24, the second clutch 61, the rear drive shaft 20, the propeller shaft 21 and the rear differential 22. Thus, the four-wheel driving is established. The vehicle is in an oversteering condition so that good cornering maneuverability, driveability and steerability are obtained.

When the vehicle makes a turn, the rotating difference in speeds of the front and rear wheels is sufficiently absorbed by the first and second pinions 52, 54 of the central differential 50, thereby preventing the tight corner braking and ensuring good operability.

If the vehicle is driven on a slippery road, the rear wheels slip first because the large amount of the torque is distributed to the rear wheels. Thus, the first clutch 62 is engaged at the clutch pressure. Consequently, the clutch torque Tc is produced in the clutch 62. The clutch 62 is provided in parallel with the carrier 55 and the second sun gear 53 of the central differential 50. Accordingly, the clutch torque Tc corresponding to the slip ratio is transmitted from the second sun gear 53 to the carrier 55 through the clutch 62, intermediate shaft 23 and connecting member 57 to increase the torque for the front wheels. To the contrary, the torque to the rear wheels is reduced to eliminate slipping, thereby improving driveability to ensure good operability and safe driving.

When the differential operation restricting torque Tc becomes maximum, the carrier 55 is directly engaged with the second sun gear 53 to lock the central differential 50. Thus, the four-wheel driving is established in accordance with the torque split corresponding to the axle loads of the front and rear wheels. Thus, the torque split is continuously controlled in accordance with the slip condition for preventing the four wheels from slipping.

If the engine speed is further increased at the fourth speed gear, the transmission is shifted to the second speed and the brake 63 is engaged so that the second sun gear 53 of the central differential 50 is locked to increase the rotating speed of the carrier 55 for providing the fifth speed. Consequently, the second speed of the transmission is greatly increased in accordance with the central differential 50. The power is transmitted to the front wheels through the carrier 55. Thus, the vehicle can be driven at a high speed of overdrive having a smaller gear ratio than that of the fourth speed.

On the other hand, the transmitting torque TD in the clutch 62 is variably controlled corresponding to the driving conditions and the slipping of the front wheels. The torque is transmitted to the rear wheels through the carrier 55, the first intermediate shaft 23 and the clutch 62. Thus, the four-wheel drive system is provided.

The vehicle is driven in an understeering condition so that the stability of the vehicle at high speed driving is improved. The torque is transmitted to the rear wheels corresponding to the transmitting torque TD. Therefore, the slipping of the wheels is prevented.

Figure 5:
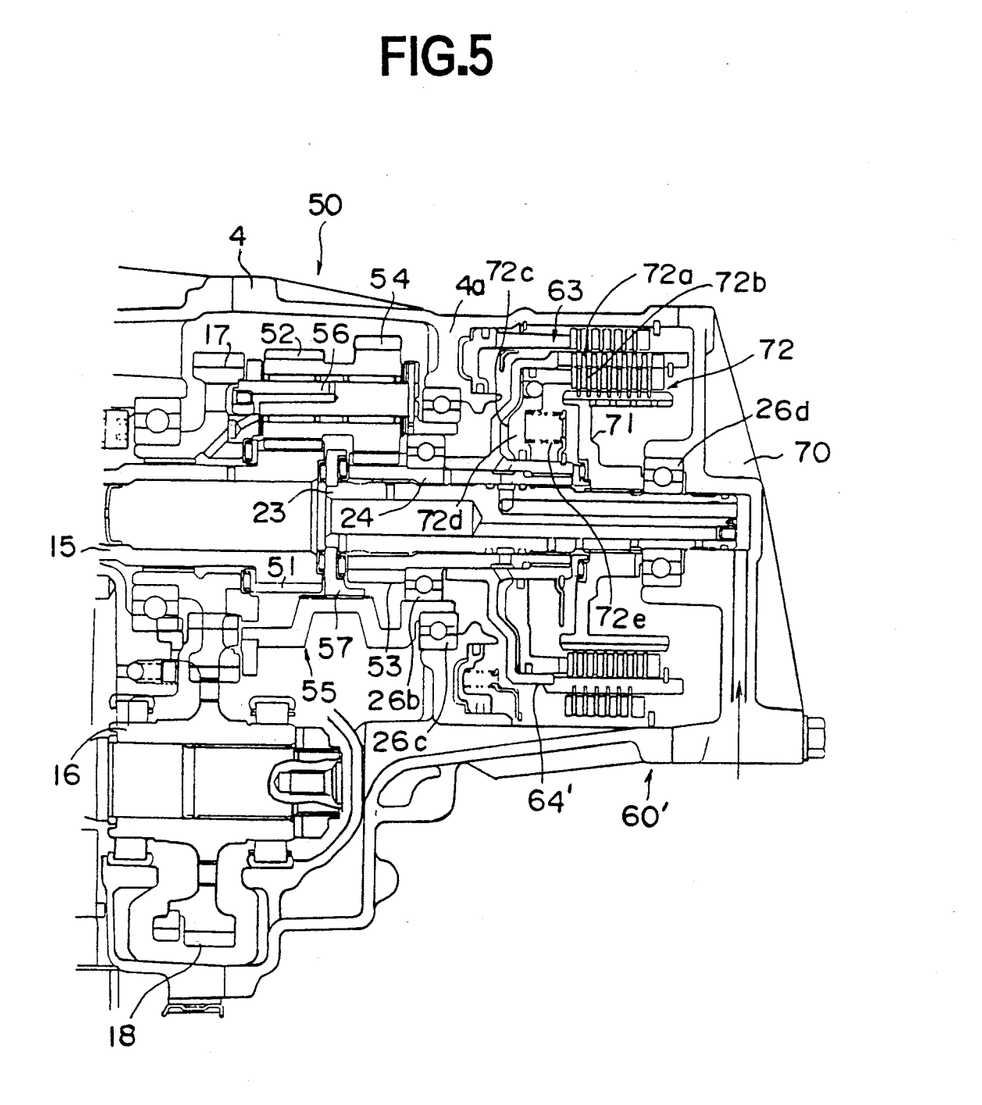
FIG. 5 shows a schematic diagram of a central differential and a control device applied to a two-wheel drive motor vehicle.

FIG. 5 shows the power transmitting system of the present invention applied to a two-wheel drive motor vehicle for increasing the number of operational ranges of the transmission of the two-wheel drive motor vehicle.

A rear cover 70 is secured to the rear end of the transfer case 4 and a central differential control device 60' is housed therein. The rear end of the first intermediate shaft 23 is rotatably mounted on the rear cover 70 through a ball bearing 26d. The central differential 50 housed in the transfer case 4 has the same structure as shown in FIG. 2.

A central differential control device 60' disposed behind the central differential 50 comprises a fluid operated multiple-disk friction clutch 72 and the 5th speed brake 63.

The clutch 72 is provided between the first intermediate shaft 23 and the second intermediate shaft 24, and comprises a drive drum 71 splined on the first intermediate shaft 23 and a driven drum 64' splined on the second intermediate shaft 24. A plurality of drive disks 72a are splined on the drive drum 71 and a plurality of driven disks 72b are splined on an inner periphery of the driven drum 64', disposed alternately with the disks 72a. A ring piston 72d is slidably mounted on the inner wall of the driven drum 64'. The piston 72d engages with the end disk 72a. An oil chamber 72c is defined between the piston 72d and the driven drum 64'. A return spring 72e is provided between the piston 72d and the driven drum 64'.

When the oil is supplied to the oil chamber 72c, the disks 72a and 72b are engaged to engage the clutch 72 so that the first intermediate shaft 23 is connected to the second intermediate shaft 24 through the clutch 72.

The 5th speed brake 63 is provided on the second intermediate shaft 24.

Describing the operation, when the vehicle is driven at a predetermined speed, the clutch 72 is engaged. Thus, the carrier 55 is directly engaged with the second sun gear 53 to lock the central differential 50 so that the power transmitted by the transmission 30 in accordance with the four forward speed and one reverse speed is transmitted to the front wheels. Thus, the two-wheel driving is established. When the vehicle is accelerated, the clutch 72 is released and the brake 63 for the fifth speed is engaged. The transmission is shifted to the second speed thereby providing the fifth speed.

Describing a lubricating system for the control device 60, an oil passage and oil ports are formed in the first intermediate shaft 23 for lubricating the thrust bearings, respective drive disks and driven disks.

The control device 60' is lubricated in the same manner as the previous embodiment.

As aforementioned, the standard torque distribution for the front torque TF and the rear torque TR are set to various values in accordance with the numbers of teeth of the sun gears and the pinions of the central differential.

Accordingly, if $Z_{p1}=Z_{p2}=18$, $Z_{s1}=24$, and $Z_{s2}=15$, the torque distribution ratio of the front wheels and the rear wheels is $$T_F:T_R = 37.5:62.5$$

A large torque can be distributed to the rear wheels.

In accordance with the aforementioned conditions, the gear ratio ip is $i_p=(24-15)/24=0.375$. If $i_2$ is 1.545, the gear ratio of the fifth speed $i_5$ represented as $i_5 = i_2 \cdot i_p$ becomes 0.579. Thus, the gear ratio which is smaller than that of the fourth speed is obtained at a proper gear ratio interval.

If the vehicle speed is further accelerated, the transmission 30 is shifted to the third speed.

A gear ratio of the sixth speed $i_6$ is represented as $$i_6 = i_3 \cdot i_p$$

If $i_3$ is 1.0, $i_6$ becomes 0.375. Thus, the gear ratio which is smaller than that of the fifth speed is obtained at a proper gear ratio interval.

The table 3 shows the operations of clutches and brakes, and examples of gear ratio of the transmission 30 and the control device 60 and torque distribution ratios in relation to the shift ranges, for providing six forward speeds and one reverse speed.

TABLE 3

| RANGES | CLUTCHES, BRAKES | | | | | | | | | | GEAR RATIO | TF/TR |
|---|---|---|---|---|---|---|---|---|---|---|---|---|
| | 44 | 40 | 43 | 35 | 34 | 38 | 37 | 36 | 63 | 61 | 62 | | |
| D RANGE | | | | | | | | | | | | | |
| 1ST SPEED | | | | ○ | ○ | | | ○ | | ○ | ● | 2.785 | 37.5/62.5 |
| 2ND SPEED | | ○ | | ○ | ○ | | | | | ○ | ● | 1.545 | " |
| 3RD SPEED | | | ○ | ○ | ○ | | | | | ○ | ● | 1.0 | " |
| 4TH SPEED | | ○ | ○ | ○ | | | | | | ○ | ● | 0.694 | " |
| 5TH SPEED | | ○ | | ○ | ○ | | | | ○ | | ⊙ | 0.579 | BY TD |
| 6TH SPEED | | | ○ | ○ | ○ | | | | ○ | | ⊙ | 0.375 | BY TD |

TABLE 3-continued

| | CLUTCHES, BRAKES | | | | | | | | | GEAR | |
| --- | --- | --- | --- | --- | --- | --- | --- | --- | --- | --- | --- |
| RANGES | 44 | 40 | 43 | 35 | 34 | 38 | 37 | 36 | 63 | 61 | 62 | RATIO | TF/TR |
| REVERSE | ○ | | | | | | ○ | | | ○ | | 2.272 | 37.5/62.5 |

Figure 6:
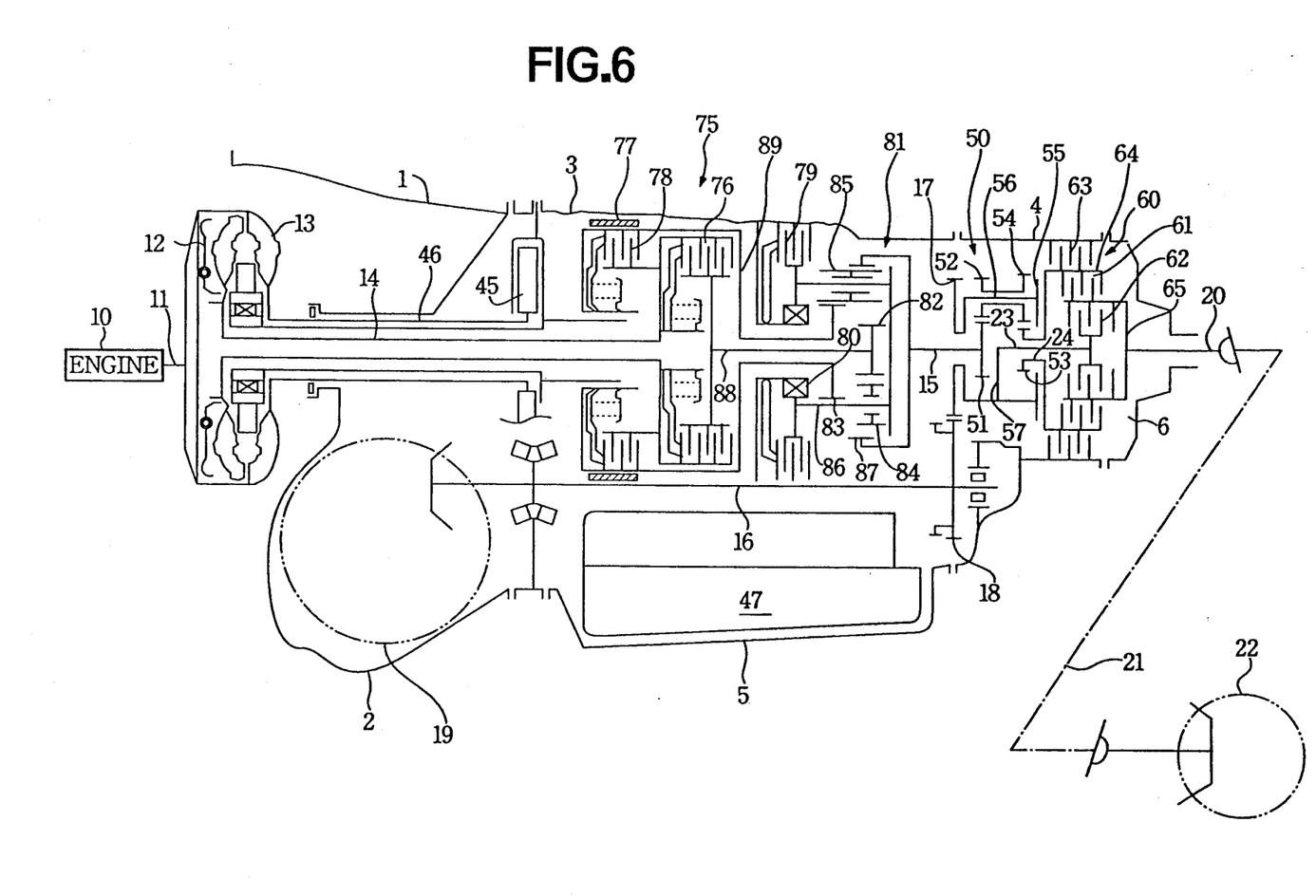
FIG. 6 shows a schematic diagram of a power transmitting system of a further embodiment of the present invention.

FIG. 6 shows a power transmission system of a further embodiment. An automatic transmission 75 comprises a planetary gear 81 for providing three forward speeds and one reverse speed. The planetary gear 81 comprises a first sun gear 82, a second sun gear 83, a ring gear 87, and a carrier 86 having a short pinion 84 and a long pinion 85. The input shaft 14 is connected to the first sun gear 82 integral with a first intermediate shaft 88 through a forward clutch 76 and to the second sun gear 83 integral with a second tubular intermediate shaft 89 through a reverse clutch 78 having a band brake 77. A low and reverse brake 79 and a one-way clutch 80 are connected to the carrier 86. The first sun gear 82 engages with the short pinion 84. The second sun gear 83 engages with the long pinion 85 which in turn engages with the ring gear 87. The ring gear 87 is connected to the output shaft 15.

The other structures which are the same as the first embodiment are identified with the same reference numerals as those of FIG. 1. However, in the control device 60 of the embodiment, the brake 63 for the fifth speed in the previous embodiment serves as a brake for shifting the operational range of the transmission.

The operation of the automatic transmission 75 for providing the three forward speeds and one reverse speed will be described hereinafter.

In a first speed of a drive range, the forward clutch 76 is engaged. The carrier 86 is locked by the engagement of the one-way clutches 80. Thus, the output of the input shaft 14 is transmitted to the output shaft 15 through the first sun gear 82 and the carrier 86.

In a drive range for 2nd speed, the brake band 77 is engaged to lock the second sun gear 83 for increasing in speed.

In the drive range of the 3rd speed, the reverse clutch 78 is engaged, so that the planetary gear 81 is integrated as one unit to directly connect the input shaft 14 with the output shaft 15.

In a reverse range (R), the reverse clutch 78 is engaged. The input shaft 14 drives the second sun gear 83. The carrier 86 is fixed by the engagement of the low and reverse brake 79. The ring gear 87 rotates in the reverse direction to drive the output shaft 15 at a large gear ratio, for providing the reverse speed.

Describing the gear ratios of the transmission 75, if the number of teeth of the first sun gear 82 is Za, the number of teeth of the second sun gear 83 is Zb, and the number of teeth of the ring gear 87 is Ze, the gear ratios $i_1$, $i_2$, $i_3$ and $iR$ of the 1st, 2nd, 3rd and reverse speeds are represented as follows.

$$i_1 = Ze/Za$$

$$i_2 = Ze(Za+Zb)/Za(Ze+Zb)$$

$$i_3 = 1.0$$

$$iR = Ze/Zb$$

If $Za=28$, $Zb=35$ and $Ze=79$, the gear ratios $i_1=2.281$, $i_2=1.559$, $i_3=1.0$ and $iR=2.275$.

In the central differential 50 of the embodiment, the numbers of the teeth $Zs_1$, $Zp_1$, $Zp_2$, and $Zs_2$ of the first sun gear 51, the first and second pinions 52, 54 and the second sun gear 53 are $Zp_1=Zp_2=18$, $Zs_1=27$ and $Zs_2=15$, that the torque distribution ratio of the front wheels and the rear wheels is $$T_F:T_R = 44.5:55.5$$

A large torque can be distributed to the rear wheels.

In accordance with the aforementioned conditions of gears and pinions of the central differential 50, the gear ratio ip is $ip=(27-15)27=0.444$. A gear ratio of the fourth speed $i_4$ is represented as $$i_4 = i_2 \cdot ip$$

Since $i_2$ is 1.559, $i_4$ becomes 0.692. Thus, the gear ratio which is smaller than that of the third speed is obtained at a proper gear ratio interval. Thus, the four-wheel drive system is established with a torque split control system.

If the vehicle is further accelerated, the transmission 75 is shifted to the third speed. A gear ratio of the fifth speed is represented as $i_5=i_3 \cdot ip$. Since $i_3$ is 1.0, $i_5$ becomes 0.444. Thus, the gear ratio which is smaller than that of the fourth speed is obtained at a proper gear ratio interval.

The operations of clutches and brakes and examples of gear ratio of the transmission 75 and the control device 60 and torque distribution ratios in relation to the shift ranges are shown in the table 4.

TABLE 4

| | CLUTCHES, BRAKES | | | | | | | | GEAR | |
| --- | --- | --- | --- | --- | --- | --- | --- | --- | --- | --- |
| RANGES | 76 | 78 | 79 | 77 | 80 | 63 | 61 | 62 | RATIO | TF/TR |
| D RANGE | | | | | | | | | | |
| 1ST SPEED | ○ | | | | ○ | | ○ | ● | 2.821 | 44.5/55.5 |
| 2ND SPEED | ○ | | | ○ | | | ○ | ● | 1.559 | " |
| 3RD SPEED | ○ | ○ | | | | | ○ | ● | 1.0 | " |
| 4TH SPEED | ○ | | | ○ | | ○ | | ⊙ | 0.692 | BY TD |
| 5TH SPEED | ○ | ○ | | | | ○ | | ⊙ | 0.444 | BY TD |
| REVERSE | | ○ | ○ | | | | ○ | | 2.275 | 44.5/55.5 |

The system is operated in the same manner as the first embodiment. Namely, when the power of the engine 10 is transmitted to the transmission 75, the planetary gear 81 is operated and the clutches 76, 78, 80 and the brakes 77, 79 are selectively actuated, so that the three forward speeds and one reverse speed are provided as described hereinbefore. The output of the transmission 75 is transmitted to the first sun gear 51 of the central differential 50.

When the vehicle is driven on roads in general, the second clutch 61 is engaged, thereby connecting the second sun gear 53 with the rear drive shaft 20. Since the standard torque split ratio is determined $T_F:T_R=44.5:55.5$, dependent on the numbers of the teeth of the first and second sun gears 51, 53 and the pinions 52, 54. Thus, 44.5% of the output torque is transmitted to the front wheels and 55.5% of the torque is transmitted to the rear wheels. Thus, the four-wheel driving is established.

If the engine speed is further increased at the third speed gear, the transmission is shifted to the second speed and the brake 63 is engaged so that the second sun gear 53 is locked to increase the rotating speed of the carrier 55 for providing the fourth speed. Consequently, the second speed of the transmission is largely increased in accordance with the central differential 50. The power is transmitted to the front wheels through the carrier 55. Thus, the vehicle can be driven at a high speed of overdrive having a smaller gear ratio than that of the third speed.

If the engine speed is further increased at the fourth speed gear, the transmission is shifted to the third speed for providing the fifth speed. Thus, the vehicle can be driven at a high speed of overdrive having a smaller gear ratio than that of the fourth speed.

In accordance with the present invention, the central differential having the control device for the four-wheel drive motor vehicle can be used for the two-wheel drive motor vehicle. Since parts of the central differential and the multiple-disk clutches of the control device can be used in various types of the power trains, adaptability of the types of vehicles is increased. Thus, mass productivity for the respective parts is improved.

The speed range of the transmission is increased solely by, using a gear ratio obtained by the central differential or by using the gear ratio combined with the gear ratio of the transmission. Thus, the system is compact in size and simplified in construction. In the four-wheel drive motor vehicle, it is also possible to improve driveability of the vehicle and improve the fuel consumption. Furthermore, the transmission is properly controlled in dependency on the driving conditions and operating mode of the vehicle. It is possible to variably control the torque distribution during the operation of the selected range of the transmission.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A power transmitting system for a motor vehicle provided with a complex planetary gear device having an input member operatively connected to a transmission for receiving a rotation of an engine through the transmission, first and second output members for transmitting the rotation to wheels, and having a third output member connected to the first output member for controlling a differential operation between the first output member and the second output member of the complex planetary gear device, the system comprising:

first friction engagement means operatively connected to the second and third output members for restricting the differential operation of the complex planetary gear device to uniformly rotate the first output member and second output member;
   second friction engagement means provided on the second output member for braking a rotation of the second output member so as to provide a higher speed gear ratio than that of a smallest gear ratio of said transmission and to improve driveability of said vehicle.

2. A system according to claim 1, wherein
said second friction engagement means is a brake provided for braking the second output member of the complex planetary gear device.

3. The system according to claim 2, wherein
said wheels include drive wheels,
the planetary gear device including a first sun gear operatively connected to an output shaft of the transmission, a carrier operatively connected to the third output member, first and second planetary pinions integral with each other and rotatably supported on the carrier, and a second sun gear connected to the second output member, the fist planetary pinion engages with the first sun gear, the second planetary pinion engages with the second sun gear, the carrier is connected to the first output member and connected to the drive wheels, and the first and second friction engagement means are fluid-operated clutches respectively.

4. The system according to claim 3, wherein each of the fluid operated clutches comprises a plurality of disks mounted on a drive drum and a driven drum, an oil chamber, a piston provided in the oil chamber for engaging the disks with each other.

5. The system according to claim 1, wherein
said transmission constitutes an automatic transmission means for providing three forward speeds.

6. The system according to claim 5, further comprising:
control means for hydraulically actuating said first and second friction engagement means to control speed gear ratio, said first friction engagement means is engaged to provide first, second and third speed gears ratios of said automatic transmission means, and respectively said second friction engagement means is engaged to provide said higher speed gear ratio.

7. The system according to claim 6, wherein said transmission is shifted to the second speed gear ratio to provide an overall system fourth speed gear ratio when said second friction engagement is engaged.

8. The system according to claim 7, wherein
said transmission is shifted to the third speed gear ratio to provide an overall system fifth speed gear ratio when said second friction engagement means is engaged.

9. The system according to claim 1, wherein said transmission constitutes an automatic transmission means for providing four forward speeds.

10. The system according to claim 9, further comprising:
control means for hydraulic actuating said first and second friction engagement means to control speed gear ratio, said first friction engagement means is engaged to provide first, second, third and fourth speed gear ratios of said automatic transmission means, and respectively said second friction engagement means is engaged to provide said higher speed gear ratio.

11. The system according to claim 10, wherein said transmission is shifted to the second speed gear ratio to provide an overall system fifth speed gear ratio when said second friction engagement means is engaged.

12. The system according to claim 11, wherein said transmission is shifted to the third speed gear ratio to provide an overall system sixth speed gear ratio when said second friction engagement means is engaged.

13. A power transmitting system adapted for a vehicle having a transmission with an output shaft, the power transmitting system comprising main parts which comprise:
   a complex planetary gear device having a first sun gear operatively connected to said output shaft of said transmission, a carrier operatively connected to either front or rear wheels of the vehicle, first and second planetary pinions integral with each other and rotatably supported on said carrier, and a second sun gear engaged with said second planetary pinion while said first sun gear is engaged with said first planetary pinion;
   an intermediate shaft operatively connected to said carrier;
   first restricting means, being rotatable, and for operatively connecting said second sun gear and said intermediate shaft to restrict differential operation of said complex planetary gear device; and
   brake means for braking rotation of said restricting means; and wherein
   said power transmitting system is useable in a two wheel drive system, wherein when said power transmitting system is used in said two wheel drive system, said restricting means is engaged and said brake means is disengaged for forward driving of the vehicle, and respectively said restricting means is disengaged and said brake means is engaged to provide a higher speed gear ratio smaller than a smallest gear ratio of the transmission.

14. The power transmitting system according to claim 13 useable in a four wheel drive system, wherein when said power transmitting system is used in said four wheel drive system, said power transmitting system further comprising second restricting means connected to and between portions of said first restricting means, wherein said intermediate shaft for distributing power to one of said front or rear wheels through said carrier, and said second restricting means for distributing power to the other of said front or rear wheels, whereby the main parts of the power transmitting system are useable for both the two and four wheel drive systems, respectively.

15. The system according to claim 1, wherein said third output member comprises a friction engagement means.

* * * * *